(12) United States Patent
Nanko et al.

(10) Patent No.: US 7,014,584 B2
(45) Date of Patent: Mar. 21, 2006

(54) TOP PULL TYPE FRONT DERAILLEUR

(75) Inventors: Yoshiaki Nanko, Sakai (JP); Kanji Kirimoto, Kaizuka (JP)

(73) Assignee: Shimano Inc., Osaka (JP)

( * ) Notice: Subject to any disclaimer, the term of this patent is extended or adjusted under 35 U.S.C. 154(b) by 322 days.

(21) Appl. No.: 10/329,499

(22) Filed: Dec. 27, 2002

(65) Prior Publication Data

US 2004/0127314 A1 Jul. 1, 2004

(51) Int. Cl.
*F16H 61/04* (2006.01)

(52) U.S. Cl. .......................... 474/80; 474/82
(58) Field of Classification Search .......... 474/78–82; 74/502.4, 502.6; 411/302

See application file for complete search history.

(56) References Cited

U.S. PATENT DOCUMENTS

| | | | |
|---|---|---|---|
| 2,737,822 A | | 3/1956 | Morse |
| 3,979,962 A | | 9/1976 | Kebsch |
| 4,002,080 A | | 1/1977 | Huret et al. |
| 4,437,848 A | | 3/1984 | Shimano |
| 5,037,355 A | | 8/1991 | Kobayashi |
| 5,607,367 A | * | 3/1997 | Patterson ............... 474/80 |
| 5,620,384 A | * | 4/1997 | Kojima et al. ............ 474/82 |
| 5,624,334 A | | 4/1997 | Lumpkin |
| 5,779,581 A | | 7/1998 | Fujii |
| 5,904,629 A | | 5/1999 | Oka |
| 6,135,905 A | | 10/2000 | Soon |
| 6,234,927 B1 | * | 5/2001 | Peng ..................... 474/82 |
| 6,270,124 B1 | | 8/2001 | Nanko |
| 6,277,044 B1 | | 8/2001 | Fujimoto |
| 6,287,228 B1 | | 9/2001 | Ichida |
| 6,471,610 B1 | * | 10/2002 | Tseng et al. ............ 474/80 |
| 6,482,115 B1 | * | 11/2002 | Takachi ................ 474/80 |
| 2002/0034996 A1 | * | 3/2002 | Valle ................... 474/82 |

FOREIGN PATENT DOCUMENTS

| | | |
|---|---|---|
| FR | 2 788 485 A1 | 7/2000 |
| JP | 52-162644 U | 12/1977 |
| JP | 60-7994 U | 3/1985 |

OTHER PUBLICATIONS

Cycle Sports, Aug. 1992, Japan.
Bible, Nov. 1993, Japan.
Cycle Sports, Jun. 1995, japan.

* cited by examiner

*Primary Examiner*—Marcus Charles
(74) *Attorney, Agent, or Firm*—Shinjyu Global IP Counselors, LLP

(57) ABSTRACT

A top pull type front derailleur is designed to move or shift a chain between two or more sprockets for changing gears. The front derailleur basically has a bicycle frame clamping band, a linkage assembly and a chain guide. The linkage assembly includes a cable connection point and is arranged between the bicycle frame clamping band and the chain guide to move the chain guide laterally towards and away from the clamping band. The clamping band has a top pull cable guide surface that is configured and arranged relative to the clamping band to guide a cable from vertically above the clamping band to the cable connection point when the front bicycle derailleur is operatively mounted to a bicycle frame. Preferably, the top pull cable guide surface is formed on a peripheral surface of a roller that is rotatably mounted on the clamping band.

14 Claims, 12 Drawing Sheets

TOP PULL TYPE FRONT DERAILLEUR

BACKGROUND OF THE INVENTION

1. Field of the Invention

The present invention generally relates to a front derailleur for a bicycle. More specifically, the present invention relates to a front derailleur for a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. The various components of the bicycle are usually mounted to the bicycle frame. Some components of the bicycle that have been extensively redesigned are the bicycle derailleurs.

One component that is mounted to the bicycle frame is the front derailleur. Generally speaking, the front derailleur is typically secured to the seat tube of the bicycle frame. The front derailleur basically includes a fixed member nonmovably secured to the seat tube of the bicycle frame, and a movable section supported to be movable relative to the fixed member. The movable section supports a chain guide having a pair of vertical surfaces for contacting a chain.

When the derailleur is mounted to the seat tube, the shift or derailleur cable can be mounted to run longitudinally along the sear tube. Typically, a braze-on connection is permanently fastened to the seat tube at a predetermined location. Depending upon the location of the braze-on connection, the angle at which the shift cable is connected to the derailleur may change such that a large pulling force is required to shift the derailleur. In other words, if the angle of the cable relative to the derailleur becomes too small, the derailleur may become difficult to shift. Therefore, a front derailleur may not operate very well on frames with very small seat tubes.

In view of the above, it will be apparent to those skilled in the art from this disclosure that there exists a need for a bicycle with an improved front derailleur assembly. This invention addresses this need in the art as well as other needs, which will become apparent to those skilled in the art from this disclosure.

SUMMARY OF THE INVENTION

One object of the present invention is to provide a front derailleur that can be mounted on a wide range of frame sizes.

Another object is to provide a front derailleur that is relatively easy to produce at a relatively inexpensive price.

Yet another object is to provide a front derailleur that is very easy to operate.

The foregoing objects can basically be attained by providing a derailleur for a bicycle is provided that is easy to operate. The front derailleur basically has a bicycle frame clamping portion, a linkage assembly with first and second linkage members, and a chain guide. The bicycle frame clamping portion includes a frame mounting portion, a top pull cable guide surface and a fixing member. The first and second linkage members including inner pivot ends and outer pivot ends, with the inner pivot ends being pivotally coupled to the first and second pivots of the fixing member, respectively, one of the first and second linkage members further including a cable connection point. The chain guide includes pivots that are pivotally coupled to the outer pivot ends of the first and second linkage members, respectively, to move the chain guide laterally towards and away from the bicycle frame clamping portion. The top pull cable guide surface is configured and arranged relative to the bicycle frame clamping portion to guide a derailleur cable from vertically above the bicycle frame clamping portion to the cable connection point.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
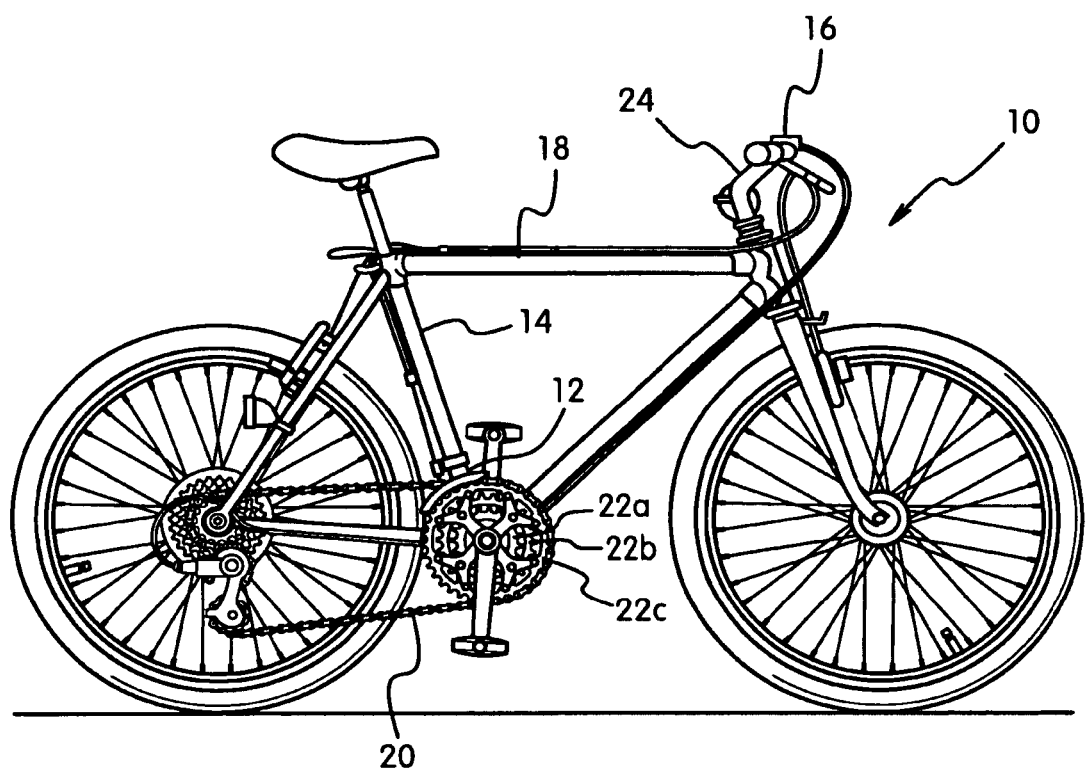
FIG. 1 is a side elevational view of a bicycle with a front derailleur in accordance with the present invention.
Figure 2:
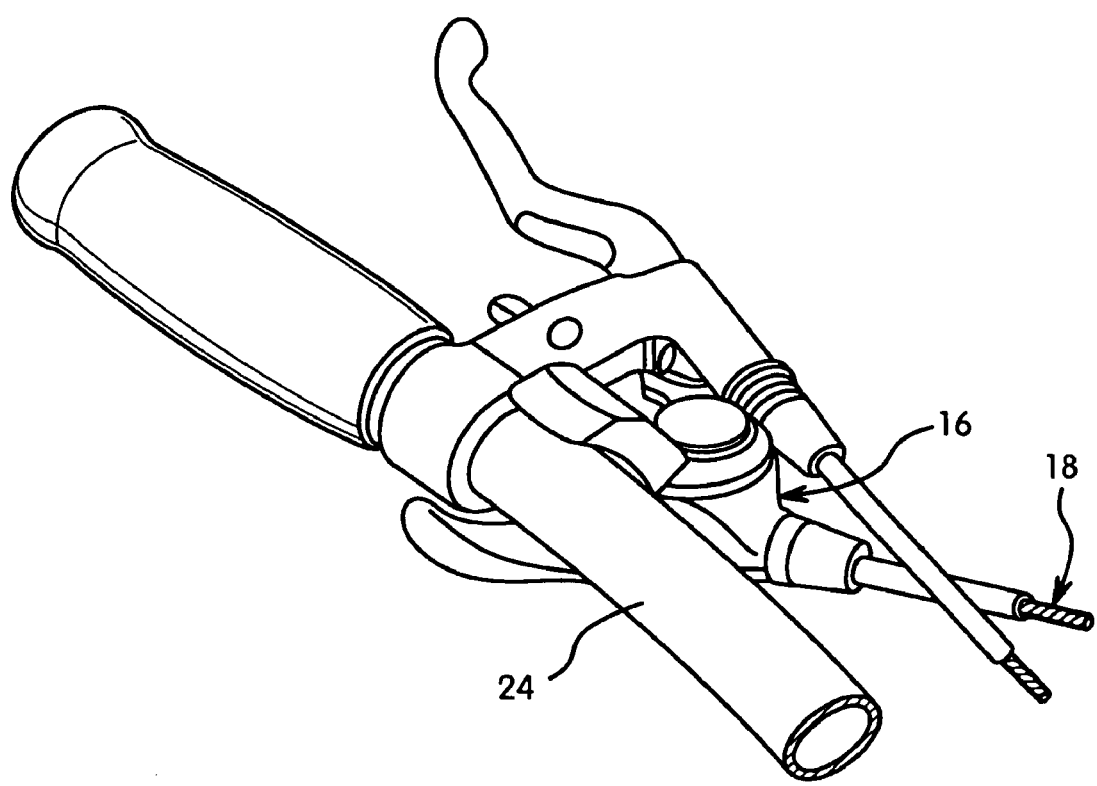
FIG. 2 is a perspective view of a front shifter or shift operating device that operates the front derailleur illustrated in FIG. 1.
Figure 3:
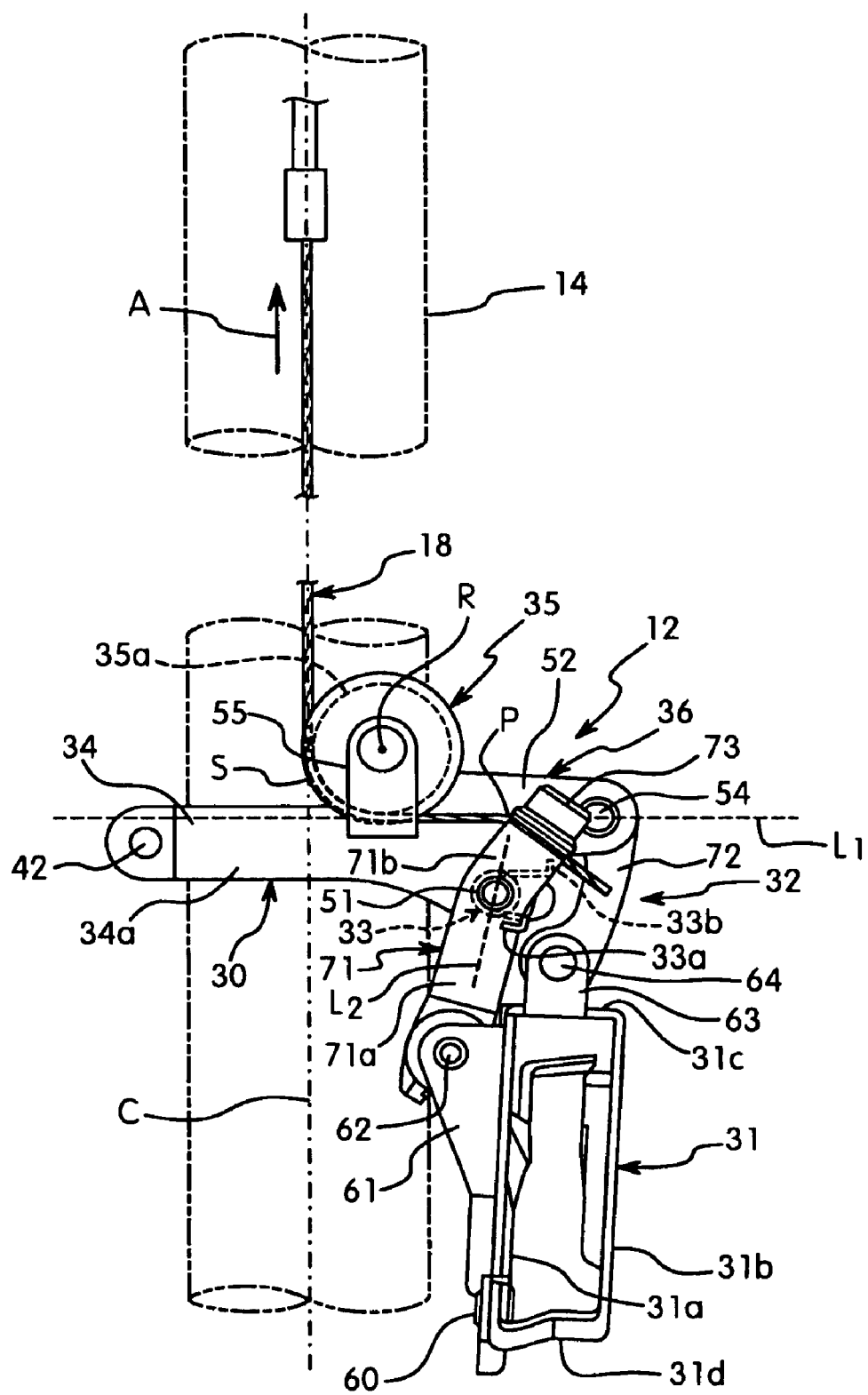
FIG. 3 is a rear elevational view of the front derailleur in a low gear position in accordance with a first embodiment of the present invention.
Figure 4:
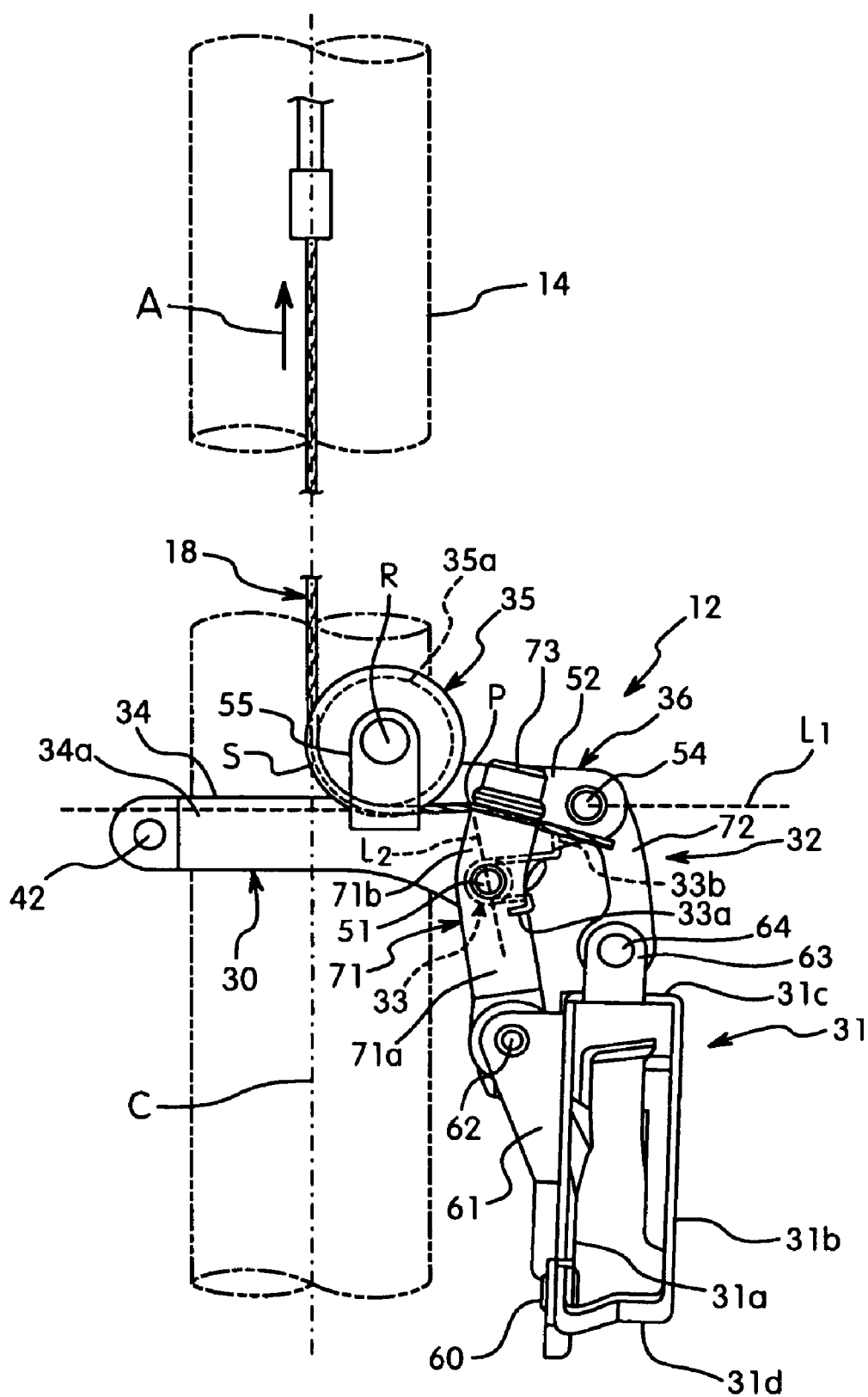
FIG. 4 is a rear elevational view of the front derailleur illustrated in FIG. 3 with the front derailleur in a middle gear position in accordance with the first embodiment of the present invention.
Figure 5:
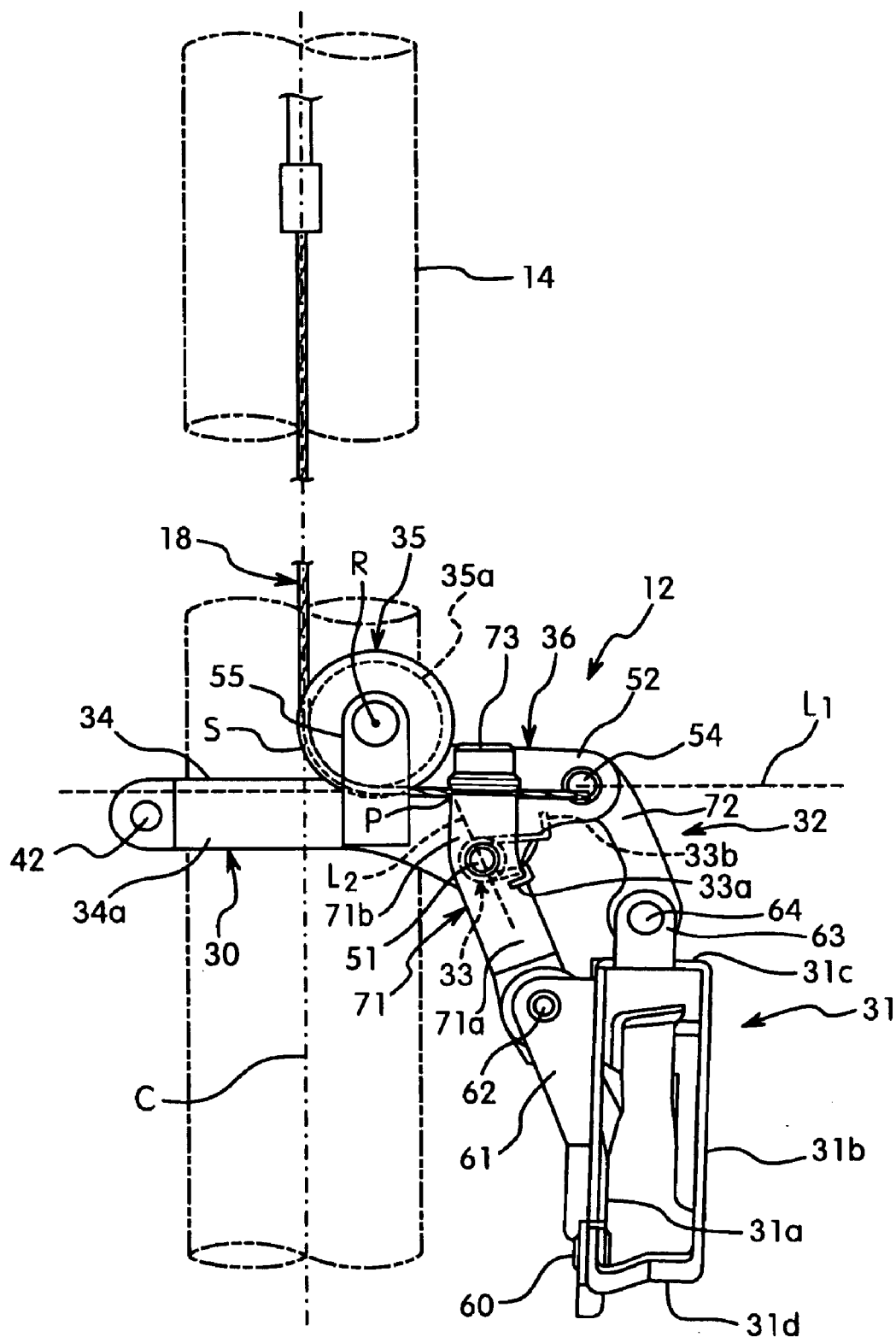
FIG. 5 is a rear elevational view of the front derailleur illustrated in FIGS. 2 and 4 with the front derailleur in a top gear position in accordance with the first embodiment of the present invention.
Figure 6:
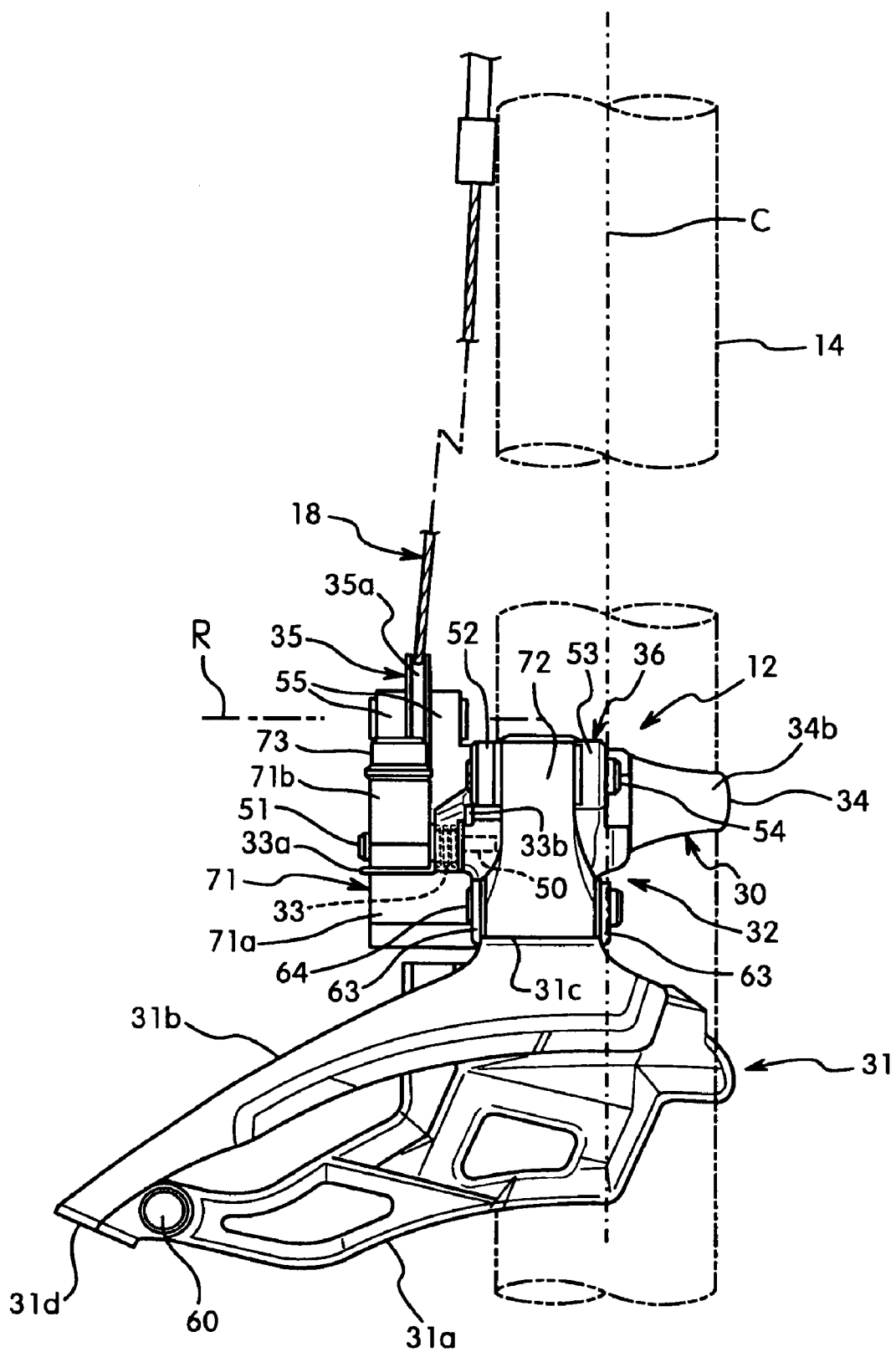
FIG. 6 is a side elevational view of the front derailleur illustrated in FIGS. 3, 4 and 5 with the front derailleur in a top gear position in accordance with the first embodiment of the present invention.

Referring initially to FIGS. 1–3, a bicycle 10 is illustrated with a front derailleur 12 fixedly coupled to its seat tube or tube 14 of the bicycle frame. The front derailleur 12 is operated in a conventional manner by a shifting unit 16 via a shift or derailleur cable 18 to move a chain 20 between three front sprockets 22a, 22b and 22c of the drive train The shifting unit 16 is mounted on the handlebar 24 as seen in FIG. 2.

Bicycles and their various components are well known in the art, and thus, bicycle 10 and its various components will not be discussed or illustrated in detail herein, except for the components that relate to the present invention. In other words, only the front derailleur 12 and the components that relate thereto will be discussed and/or illustrated herein. As used herein, the terms "forward, rearward, upward, above, downward, below and transverse" refer to those directions of a bicycle in its normal riding position, to which the front derailleur 12 is attached. Accordingly, these terms, as utilized to describe the front derailleur 12 in the claims, should be interpreted relative to bicycle 10 in its normal riding position.

Basically, as seen in FIGS. 3–7, the front derailleur 12 includes a bicycle frame clamping band or tubular clamping portion 30, a chain guide 31, a linkage assembly 32 and a biasing member 33. The linkage assembly 32 is coupled between the clamping band 30 and the chain guide 31 to move the chain guide 31 laterally-towards and away from the clamping band. The linkage assembly 32 is preferably designed such that the biasing member (torsion spring) 33 normally biases the chain guide 31 in a transverse direction towards the frame of the bicycle 10.

As best seen in FIGS. 3–6, the clamping band 30 is located above the chain guide 31 such that the chain guide 31 moves from a retracted (low gear) position to an extended (high gear) position when the cable 18 is pulled as indicated by arrow A. The clamping band 30 includes a frame mounting portion 34, a top pull cable guide roller 35 and a fixing portion or member 36 that attaches the linkage assembly 32 to the frame mounting portion 34 of the clamping band 30. The clamping band 30 is preferably clamped directly to the seat tube 14 by the frame mounting portion 34.

Figure 7:
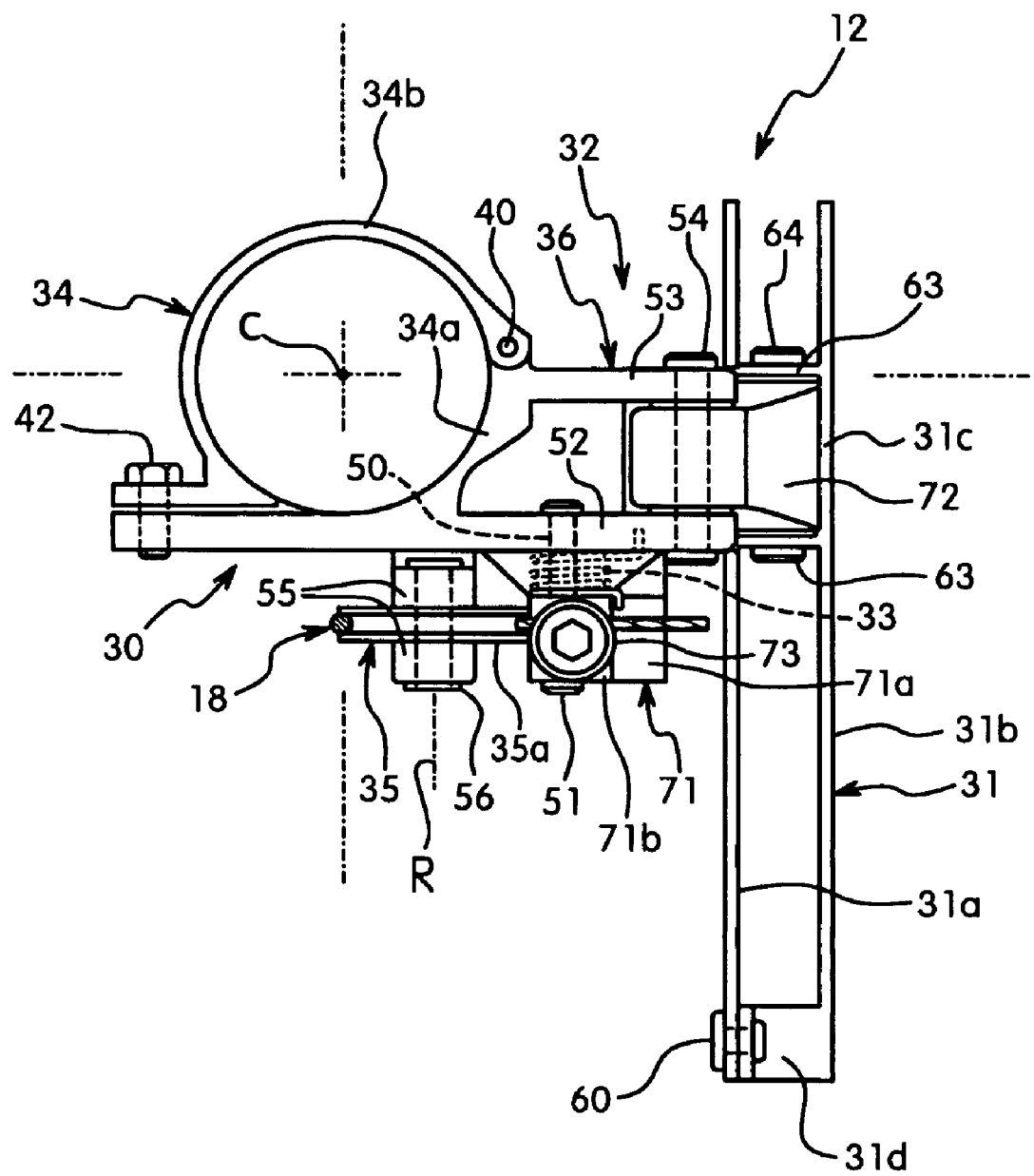
FIG. 7 is a top plan view of the front derailleur illustrated in FIGS. 3–6 with the derailleur in the top gear position in accordance with the first embodiment of the present invention.
Figure 8:
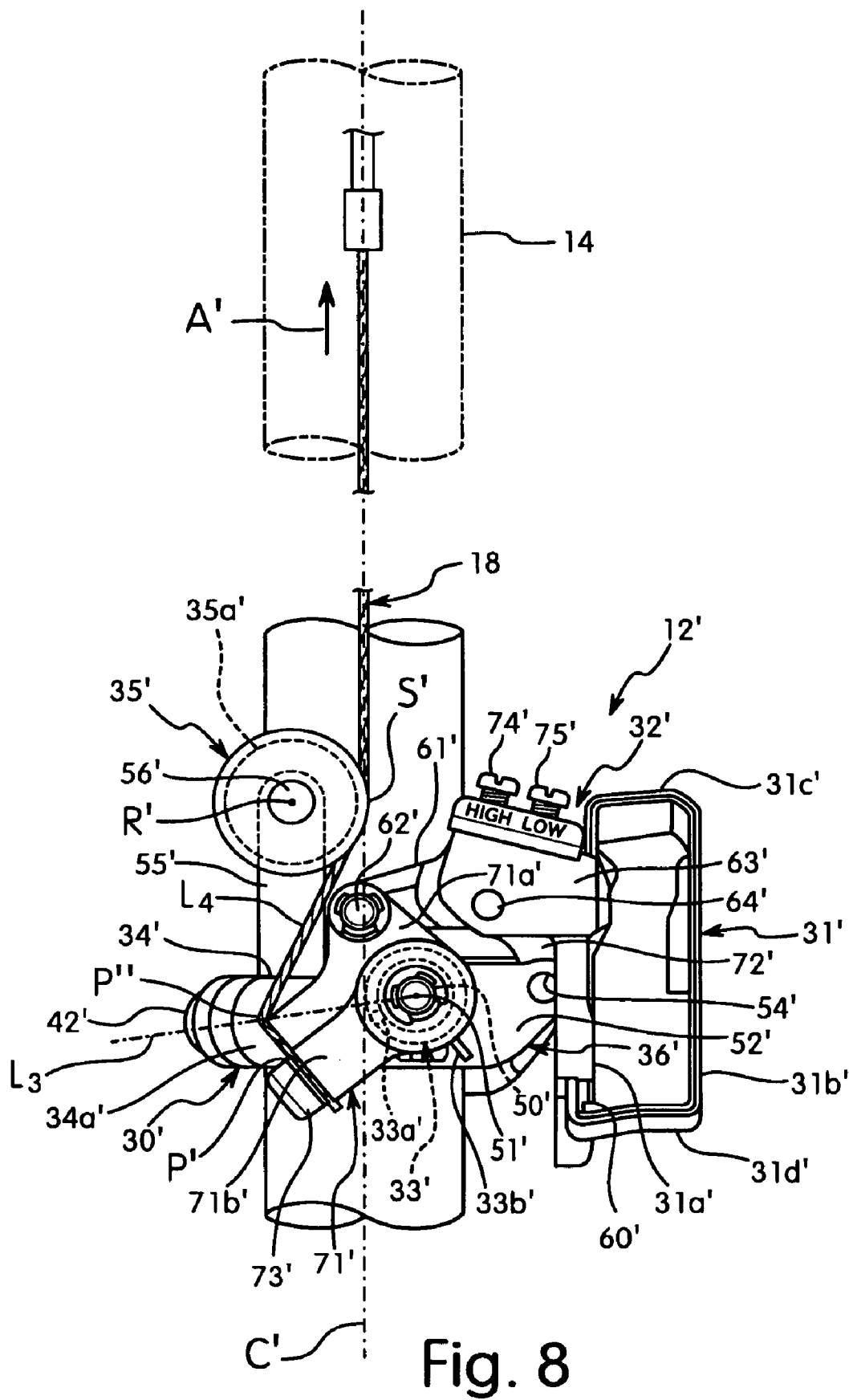
FIG. 8 is a rear elevational view of a front derailleur in accordance with a second embodiment of the present invention with the front derailleur in a low gear position.
Figure 9:
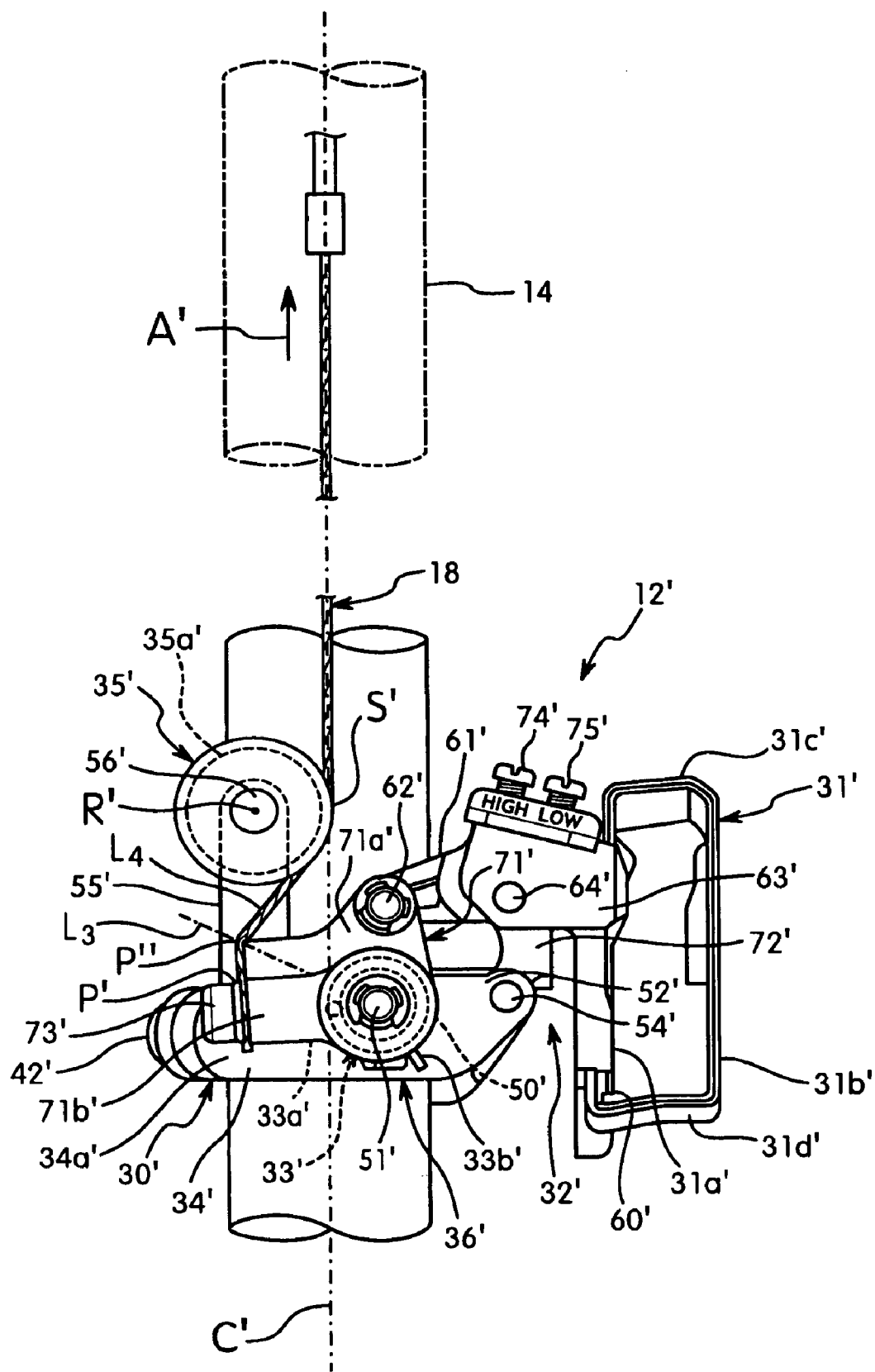
FIG. 9 is a rear elevational view of the front derailleur illustrated in FIG. 8 with the front derailleur in a middle gear position in accordance with the second embodiment of the present invention.
Figure 10:
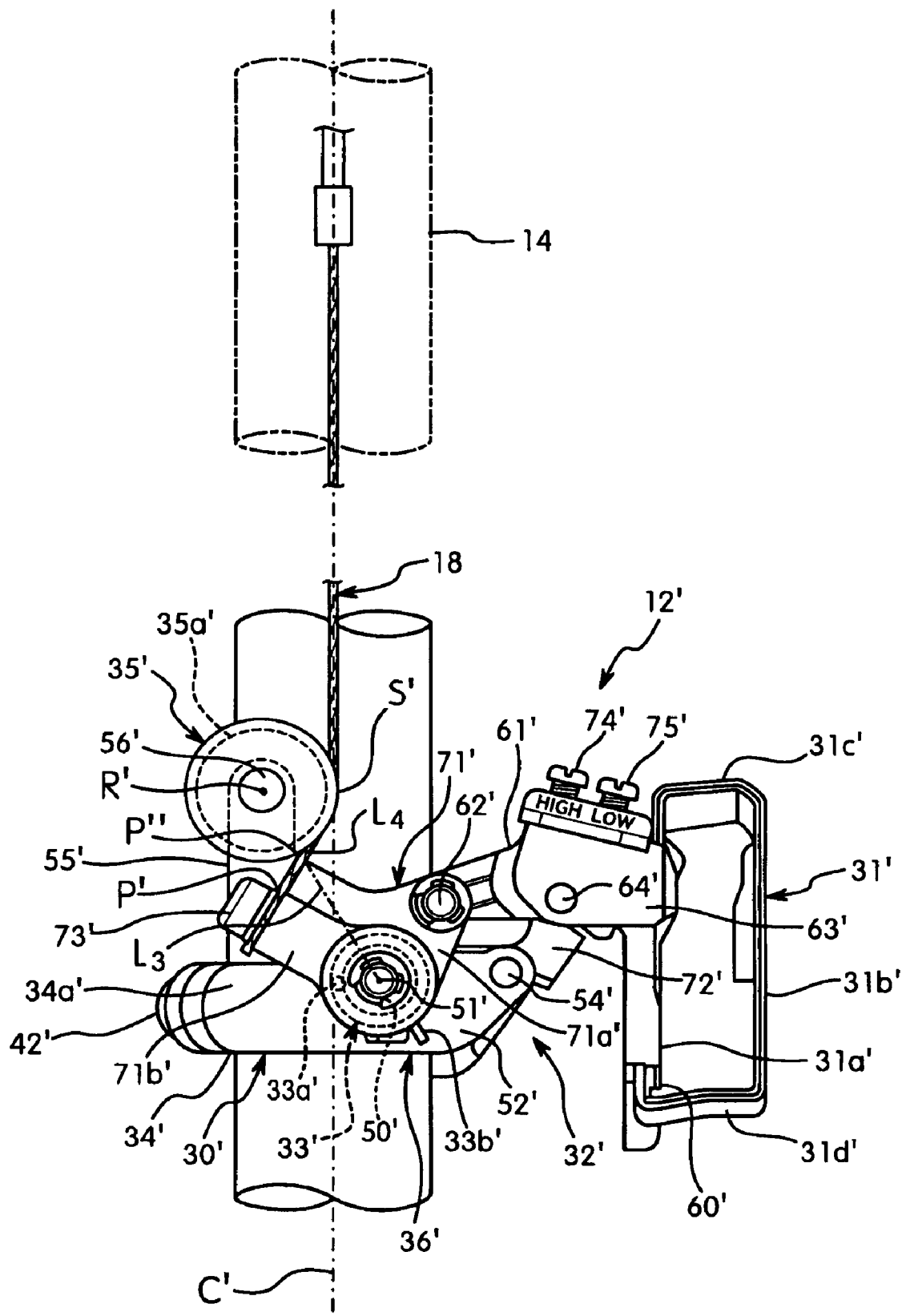
FIG. 10 is a rear elevational view of the front derailleur illustrated in FIGS. 8 and 9 with the front derailleur in a top gear position in accordance with the second embodiment of the present invention.
Figure 11:
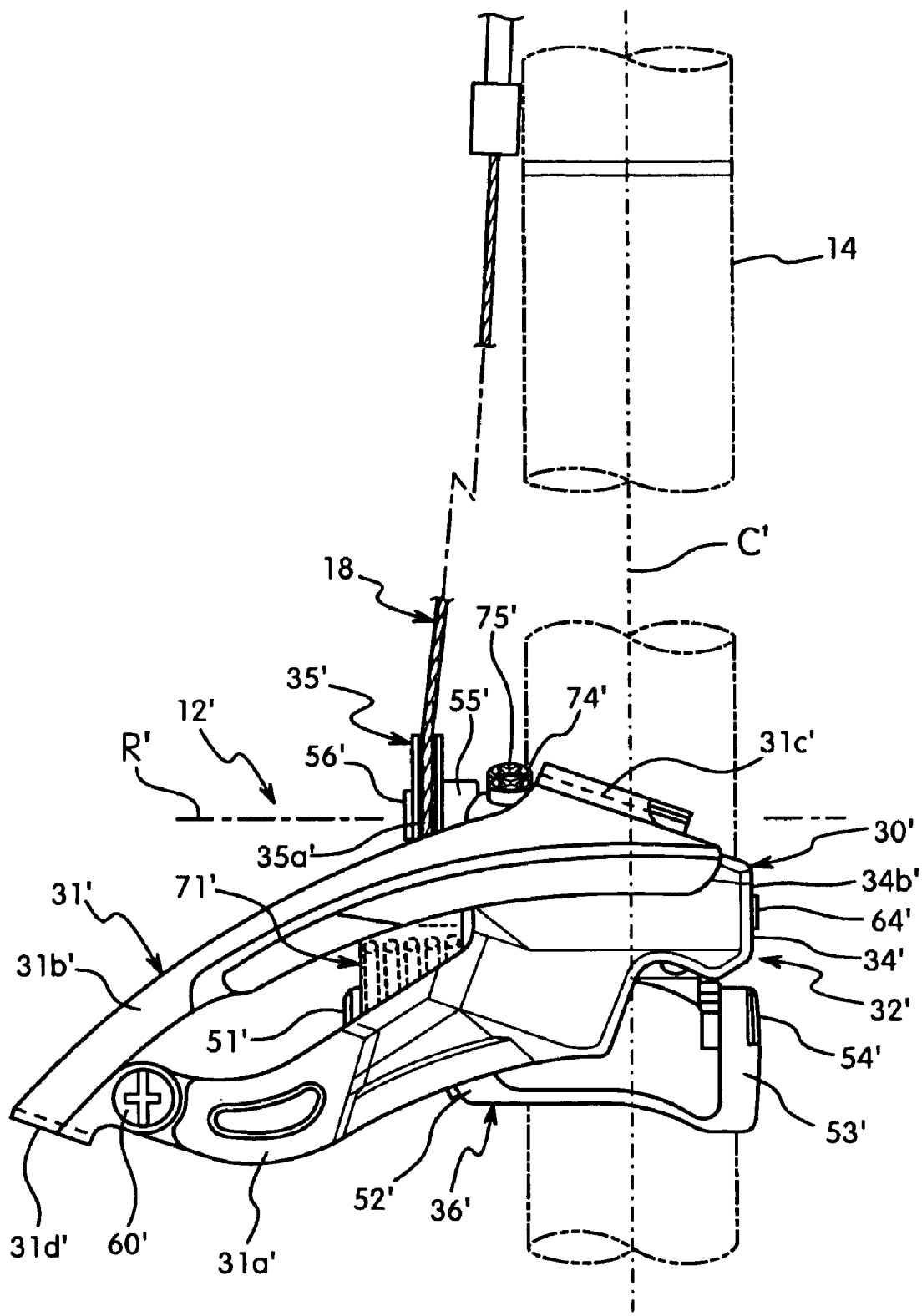
FIG. 11 is a side elevational view of the front derailleur illustrated in FIGS. 8–10 with the front derailleur in a top gear position in accordance with the first embodiment of the present invention.
Figure 12:
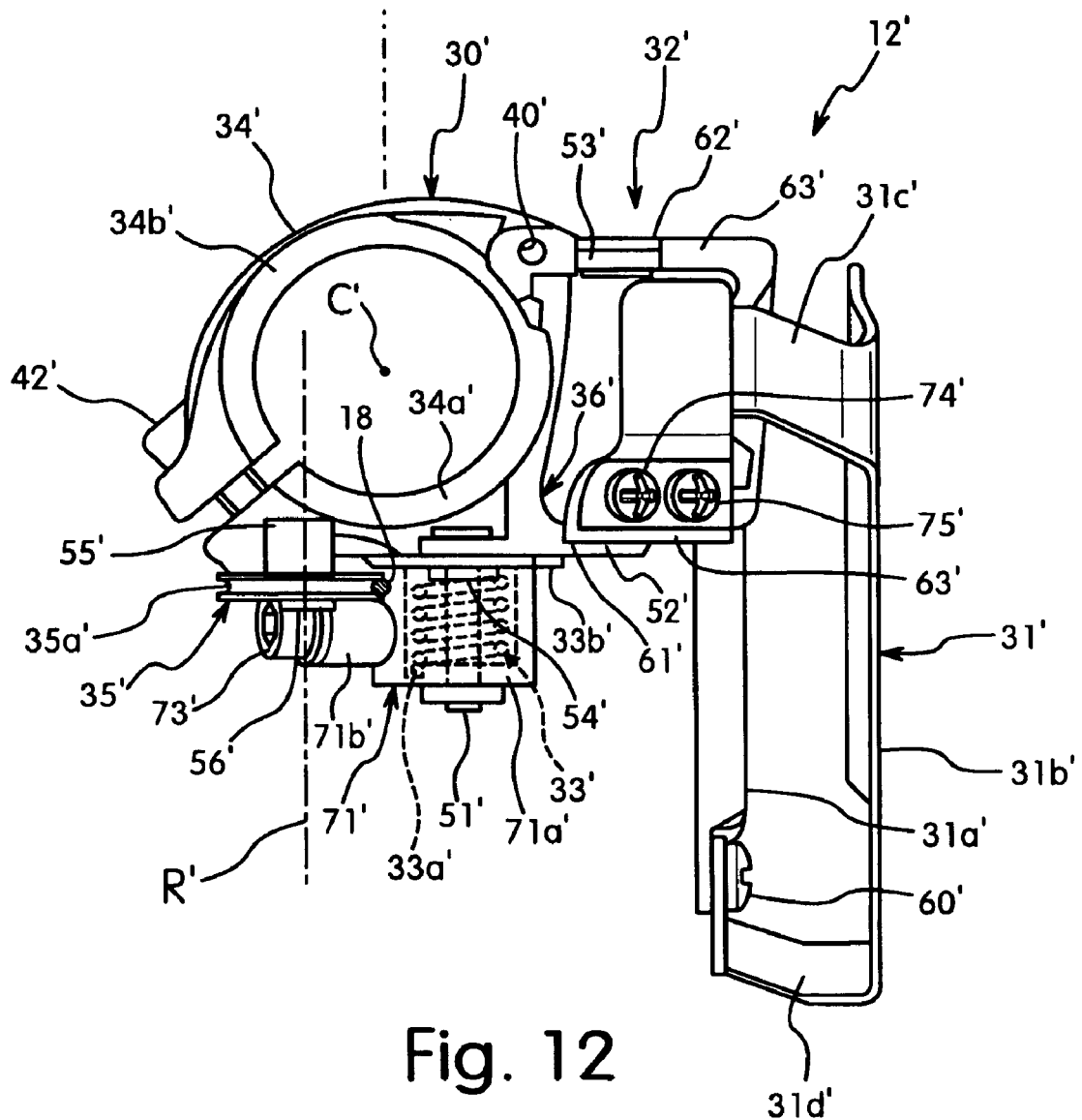
FIG. 12 is a top plan view of the front derailleur illustrated in FIGS. 9–11 with the derailleur in the middle gear position in accordance with the second embodiment of the present invention.

As best seen in FIG. 7, the frame mounting portion 34 of the clamping band 30 basically includes a first C-shaped clamping portion 34a, a second C-shaped clamping portion 34b, a pivot pin 40 and a fastener 42. When the first and second clamping portions 34a and 34b are coupled together, a center frame mounting axis C if formed by the curved inner mounting surfaces of the first and second clamping portions 34a and 34b. This center frame mounting axis C corresponds to the center axis of the seat tube 14. The first and second clamping portions 34a and 34b are constructed of a rigid material to secure the front derailleur 12 to the seat tube 14 of the bicycle 10. Preferably, the clamping portions 34a and 34b are constructed of metal. Of course, the clamping portions 34a and 34b could be constructed of other materials such as a hard rigid plastic material. In the illustrated embodiment, the clamping portions 34a and 34b are constructed by utilizing other conventional manufacturing techniques such as casting and/or machining. Of course, the clamping portions 34a and 34b can also be constructed of sheet metal that is bent to the desired shape.

The first ends of the clamping portions 34a and 34b are pivotally coupled together by the pivot pin 40, which extends in a substantially vertical direction relative to bicycle 10. The other ends of the clamping portions 34a and 34b are releasably connected together via the fastener 42. The fastener 42 is preferably a screw or bolt that is threaded into a threaded hole of the first clamping portion 34a. Of course, the fastener 42 can be utilized in conjunction with a nut, or the like.

The clamping portion 34a includes the fixing member 36 for coupling the linkage assembly 32 thereto. The fixing member 36 has a first pivot hole 50 for receiving a first pivot pin 51 therein to couple another portion of the linkage assembly 32 thereto. Preferably, the pivot pin 51 is a rivet or other suitable fastener. The fixing member 36 also has a pair of substantially parallel mounting flanges 52 and 53 that are horizontally spaced apart. The mounting flanges 52 and 53 each have a pivot hole that receives a second pivot pin 54 for mounting a portion of the linkage assembly 32 thereto, as explained below. Preferably, the pivot pin 54 is a rivet or other suitable fastener. As explained below in more detail, the fixing member 36 with the first pivot hole 50 forms one of the links (third link) of the linkage assembly 32. Thus, fixing member 36 includes portions (i.e., the third link with the first and second pivots) of the linkage assembly 32. In other words, the portion of the fixing member 36 that includes the pivot pins 51 and 54 forms a non-movable third link of the linkage assembly 32.

The clamping portion 34a has a pair of vertically extending flanges 55 that rotatably mounts the top pull cable guide roller 35 to the clamping band 30 in a fixed position. Thus, the cable 18 is always coupled to the front derailleur 12 in the same way. In other words, the dimensions of the seat tube 14 does not change the orientation of the cable 18 where it is attached to the front derailleur 12. The top pull cable guide roller 35 is rotatably coupled to the flanges 55 by a pivot pin 56 that has a rotation axis R. The top pull cable guide roller 35 has a peripheral cable receiving groove 35a that guides the cable 18. The radially innermost area of the cable receiving groove 35a forms a top pull cable guide surface S that configured and arranged relative to the clamping band 30 to guide the cable 18 from vertically above the clamping band 30 to a cable connection point P, when the front bicycle derailleur 14 is operatively mounted to a bicycle frame. Thus, the top pull cable guide surface S is formed on the inner peripheral surface of the roller 35. It will be apparent from this disclosure that instead of using the roller 35, a non-rotating member can be used, if needed and/or desired. The top pull cable guide surface S and the cable connection point P are arranged such that the cable 18 extends substantially perpendicular to the center frame mounting axis C of the frame mounting portion 34 of the clamping band 30. Preferably, a section of the top pull cable guide surface S is arranged to be substantially adjacent or aligned with the center frame mounting axis C of the frame mounting portion 34 of the clamping band 30. The top pull cable guide surface S and the cable connection point P are further arranged in this embodiment such that the top pull cable guide surface S is at least partially disposed laterally between the cable connection point P and the center frame mounting axis C of the frame mounting portion 34 of the clamping band 30. The top pull cable guide surface S is disposed laterally on one lateral side of the first pivot pin 51, and the chain guide 31 is located on a second lateral side of the first pivot pin 51. The top pull cable guide surface S, the pivot axis of the pivot pin 54 and the cable connection point P are substantially aligned laterally to form a line $L_1$ that extends perpendicularly to a center frame mounting axis C of the frame mounting portion 34 of the clamping band 30.

The chain guide 31 is preferably constructed of a hard rigid material. For example, the chain guide 31 is preferably constructed of a metal material such as a rigid sheet metal that is bent to the desired shape. The chain guide 31 has a chain receiving slot that is formed by a pair of vertical shift plates 31a and 31b. The vertical shift plates 31a and 31b are adapted to engage the chain 20 and thus move the chain 20 in a direction substantially transverse to the bicycle 10. The shift plates 31a and 31b are connected together by a pair of plates 31c and 31d. The upper plate 31c is integrally formed between the shift plates 31a and 31b. The lower plate 31d has one end that is integrally formed with the outer shift plate 31b and the other end that is attached to the inner shift plate 31a via a fastener 60, such as a screw or rivet.

The chain guide 31 also has a pair of first mounting flanges 61 (only one shown) extending outwardly from the inner shift plate 31a for pivotally coupling a first link of the linkage assembly 32 thereto by a third pivot pin 62. The chain guide 31 also has a pair of second mounting flanges 63 extending in a substantially vertical direction from the plate 31c for pivotally coupling a second link of the linkage assembly 32 thereto by a fourth pivot pin 64. As explained below in more detail, the portion of the chain guide 31 with the mounting flanges 61 and 63 forms one of the links (fourth link) of the linkage assembly 32. Thus, the chain guide 31 includes portions (i.e., the fourth link with the third and fourth pivots) of the linkage assembly 32. In other words, the portion of the chain guide 31 that includes the pivot pins 62 and 64 forms a fourth link of the linkage assembly 32.

As apparent from the discussion above, the linkage assembly 32 is preferably a four-bar linkage that is formed by a first link or linkage member 71 and a second link or linkage member 72 extending between the fixing member 36 and the chain guide 31. As mentioned above, the portion of the fixing member 36 that includes the pivot pins 51 and 54 forms the third link, while the portion of the chain guide 31 that includes the pivot pins 62 and 64 forms the fourth link. The first and second links 71 and 72 have their inner pivot ends pivotally coupled to the first and second pivots of the fixing member 36 via the pivot pins 51 and 54 and their outer pivot ends pivotally coupled to the third and fourth pivots of the chain guide 31, respectively, via the pivot pins 62 and 64. In this embodiment, the third and fourth pivots are located below the frame mounting portion 34.

When the linkage assembly 32 holds the chain guide 31 in its extended position, the chain guide 31 is located over the outermost sprocket 22c, i.e., the furthest sprocket from the seat tube 14. These movements of the chain guide 31 and the linkage assembly 32 are controlled by the shifting unit 16. Specifically, when the rider operates one of the levers of the shifting unit 16 to pull the shift cable 18 against the urging force of the biasing member 33, then the chain guide 31 is moved from one of its retracted position to its one of extended position via the linkage assembly 32. When the rider operates one of the levers of the shifting unit 16 to release the shift cable 18, then the chain guide 31 is moved from its one of extended position to its one of retracted position via the linkage assembly 32 by the urging force of the biasing member 33.

The first link 71 has a pair of pivot points formed by the pivot pins 51 and 62 that lie on a longitudinal line which is substantially parallel to a longitudinal line that passes through the pivot points formed by the pivot pins 54 and 64 of the second link 72. Similarly, the pivot points of the pivot pins 51 and 54 of each first end of the first and second links 71 and 72 lie on a line which is substantially parallel to a line that passes through the pivot points of the pivot pins 62 and 64 of the other or second ends of the first and second links 71 and 72.

The first link 71 is operatively coupled to the shifting unit 16 via the shift cable 18 for moving the chain guide 31 between the first, second and third gear positions. More specifically, the first link 71 is a L-shaped member that is pivotally mounted on the pivot pin 51 extending outwardly from the first C-shaped clamping portion 34a. The first link 71 has two mounting holes that receive the pivot pins 51 and 62 for the linkage assembly 32.

The first link 71 includes a link portion 71a and an extension portion 71b. The link portion 71a has the first and third pivots. The extension portion 71b has the cable connection point P formed thereon. The extension portion 71b of the first link 71 has a cable attachment member or screw 73 coupled thereto to form a cable attachment point P at its free end. The cable attachment member 73 is a wire clamp for attaching the inner wire of cable 18 thereto.

The first pivot axis of pivot pin 51 and the cable connection point P are arranged along a line $L_2$ that intersects with the line $L_1$ at the cable connection point P. In the bottom gear position (FIG. 3), the line $L_2$ intersects with the line $L_1$ at an acute angle that is close to seventy five degrees. In the middle gear position (FIG. 4), the line $L_2$ intersects with the line $L_1$ at an obtuse angle that is close to one hundred degrees (substantially ninety). In the top gear position (FIG. 5), the line $L_2$ intersects with the line $L_1$ at an obtuse angle that is close to one hundred twenty-five degrees. Thus, the top pull cable guide surface S, the first pivot axis of pivot pin 51 and the cable connection point P are arranged relative to each other when the chain guide 31 is located in a middle position (FIG. 4) such that a section of the cable 18 that extends between the first link 71 and the top pull cable guide surface S extends substantially perpendicular to the line $L_2$ extending from the first pivot axis of the pivot pin 51 to cable connection point P where the section of the cable 18 leaves the extension portion 71b.

The biasing member 33 is preferably a torsion spring having its coiled portion positioned around the pivot pin 51. The biasing member 33 urges the first and second links 71 and 72 in a direction such that the chain guide 31 is urged to a low gear position that is located laterally adjacent to the clamping band 30. The biasing member 33 has a first end 33a engaging a side of the first link 71, and a second end 33b engaging a portion on the fixing member 36 of the clamping band 30 for normally biasing the chain guide 31 from its extended position to its retracted position. In other words, biasing member or torsion spring 33 is normally placed under tension to urge the cable guide 32 from its extended position to its retracted position. Of course, movement of the chain guide 31 is controlled by the shifting unit 16 moving cable 18 in a relatively conventional manner.

Second Embodiment

Referring now to FIGS. 8–12, a front derailleur 12' in accordance with a second embodiment will now be explained. The front derailleur 12' is installed on the bicycle 10 such that the front derailleur 12' is operated by the front shifter 16 via the cable 18. Basically, the front derailleur 12' includes a bicycle frame clamping band or tubular clamping member 30', a chain guide 31', a linkage assembly 32' and a biasing member 33'. The linkage assembly 32' is coupled between the clamping band 30' and the chain guide 31' to move the chain guide 31' laterally towards and away from the clamping band. The linkage assembly 32' is preferably designed such that the biasing member (torsion spring) 33' normally biases the chain guide 31' in a transverse direction towards the frame of the bicycle 10.

The clamping band 30' is located below the chain guide 31' such that the chain guide 31' moves from a retracted (low gear) position to an extended (high gear) position when the cable 18 is pulled as indicated by arrow A'. The clamping band 30' includes a frame mounting portion 34', a top pull cable guide roller 35' and a fixing portion or member 36' that attaches the linkage assembly 32' to the clamping band 30'. The clamping band 30' is preferably clamped directly to the seat tube 14.

The frame mounting portion 34' of the clamping band 30' basically includes a first C-shaped clamping portion 34a', a second C-shaped clamping portion 34b', a pivot pin 40' and a fastener 42'. When the first and second clamping portions 34a' and 34b' are coupled together, a center frame mounting axis C' if formed by the curved inner mounting surfaces of the first and second clamping portions 34a' and 34b'. This center frame mounting axis C' corresponds to the center axis of the seat tube 14. The first and second clamping portions 34a' and 34b' are constructed of a rigid material to secure the front derailleur 12' to the seat tube 14 of the bicycle 10. Preferably, the clamping portions 34a' and 34b' are constructed of metal. Of course, the clamping portions 34a' and 34b' could be constructed of other materials such as a hard rigid plastic material. In the illustrated embodiment, the clamping portions 34a' and 34b' are constructed by utilizing other conventional manufacturing techniques such as casting and/or machining. Of course, the clamping portions 34a' and 34b' can also be constructed of sheet metal that is bent to the desired shape.

The first ends of the clamping portions 34a' and 34b' are pivotally coupled together by the pivot pin 40', which extends in a substantially vertical direction relative to bicycle 10. The other ends of the clamping portions 34a' and 34b' are releasably connected together via the fastener 42'. The fastener 42' is preferably a screw or bolt that is threaded into a threaded hole of the first clamping portion 34a'. Of course, the fastener 42' can be utilized in conjunction with a nut, or the like.

The clamping portion 34a' includes the fixing member 36' for coupling the linkage assembly 32' thereto. The fixing member 36' has a first pivot hole 50' for receiving pivot pin 51' therein to couple another portion of the linkage assembly 32' thereto. Preferably, the pivot pin 51' is a rivet or other suitable fastener. The clamping portion 34a' also has a pair of substantially parallel mounting flanges 52' and 53' that are horizontally spaced apart. The mounting flanges 52' and 53' each have a pivot hole receives that a second pivot pin 54' for mounting a portion of the linkage assembly 32' thereto, as explained below. Preferably, the pivot pin 54' is a rivet or other suitable fastener. As explained below in more detail, the fixing member 36' with the first pivot hole 50' forms one of the links (third link) of the linkage assembly 32'. Thus, the fixing member 36' includes portions (i.e., the third link with the first and second pivots) of the linkage assembly 32'. In other words, the portion of the fixing member 36' that includes the pivot pins 51' and 54' forms a non-movable third link of the linkage assembly 32'.

The clamping portion 34a' has a vertically extending flange 55' that rotatably mounts the top pull cable guide roller 35' to the clamping band 30' in a fixed position. Thus, the cable 18 is always coupled to the front derailleur 12' in the same way. In other words, the dimensions of the seat tube 14 does not change the orientation of the cable 18 where it is attached to the front derailleur 12'. The top pull cable guide roller 35' is rotatably coupled to the flange 55' by a pivot pin 56' that has a rotation axis R'.

The top pull cable guide roller 35' has a peripheral cable receiving groove 35a' that guides the cable 18. The radially innermost area of the cable receiving groove 35a' forms a top pull cable guide surface S that configured and arranged relative to the clamping band 30' to guide the cable 18 from vertically above the clamping band 30' to a cable connection point P', when the front bicycle derailleur 14' is operatively mounted to a bicycle frame. Thus, the top pull cable guide surface S' is formed on a peripheral surface of the roller 35'. It will be apparent from this disclosure that instead of using the roller 35', a non-rotating member can be used, if needed and/or desired.

In this embodiment, the first pivot pin 50' is arranged on the opposite side of the center frame mounting axis C' of the clamping band 30' from the top pull cable guide surface S' and the cable connection point P'. Preferably, similar to the first embodiment, a section of the top pull cable guide surface S' is arranged to be substantially adjacent or aligned with the center frame mounting axis C' of the frame mounting portion 34' of the clamping band 30'. The top pull cable guide surface S' and the cable connection point P' are further arranged in this embodiment such that the top pull cable guide surface S' is at least partially disposed laterally between the cable connection point P' and the center frame mounting axis C' of the frame mounting portion 34' of the clamping band 30'.

The top pull cable guide surface S' and the cable connection point P' are disposed laterally on a first lateral side of the first pivot pin 51' of the frame mounting portion 34' of the clamping band 30', and the chain guide 31' is located on a second lateral side of the first pivot of the frame mounting portion 34' of the clamping band 30'. The rotation axis R' of the roller 35' and the cable connection point P' are substantially aligned along a plane that is parallel to a center frame mounting axis C' of the frame mounting portion 34' of the bicycle frame clamping band 30'.

The chain guide 31' is preferably constructed of a hard rigid material. For example, the chain guide 31' is preferably constructed of a metal material such as a rigid sheet metal that is bent to the desired shape. The chain guide 31' has a chain receiving slot that is formed by a pair of vertical shift plates 31a' and 31b'. The vertical shift plates 31a' and 31b' are adapted to engage the chain 20 and thus move the chain 20 in a direction substantially transverse to the bicycle 10. The shift plates 31a' and 31b' are connected together by a pair of plates 31c' and 31d'. The upper plate 31c' is integrally formed between the shift plates 31a' and 31b'. The lower plate 31d' has one end that is integrally formed with the outer shift plate 31b' and the other end that is attached to the inner shift plate 31a' via a fastener 60', such as a screw or rivet.

The chain guide 31' also has a first mounting flange 61' extending outwardly from the inner shift plate 31a' for pivotally coupling a first link of the linkage assembly 32' thereto by a third pivot pin 62'. The chain guide 31' also has a pair of second mounting flanges 63' extending in a substantially vertical direction from the plate 31c' for pivotally coupling a second link of the linkage assembly 32' thereto by a fourth pivot pin 64'. As explained below in more detail, the portion of the chain guide 31' with the mounting flanges 61' and 63' forms one of the links (fourth link) of the linkage assembly 32'. Thus, the chain guide 31' includes portions (i.e., the fourth link with the third and fourth pivots) of the linkage assembly 32'. In other words, the portion of the chain guide 31' that includes the pivot pins 62' and 64' forms a fourth link of the linkage assembly 32'.

As apparent from the discussion above, the linkage assembly 32' is preferably a four-bar linkage that is formed by a first link or linkage member 71' and a second link or linkage member 72' extending between the fixing member 36' and the chain guide 31'. As mentioned above, the portion of fixing member 36' that includes the pivot pins 51' and 54' forms the third link, while the portion of the chain guide 31' that includes the pivot pins 62' and 64' forms the fourth link. The first and second links 71' and 72' have their inner pivot ends pivotally coupled to the first and second pivots of the fixing member 36' via the pivot pins 51' and 54' and their outer pivot ends pivotally coupled to the third and fourth pivots of the chain guide 31', respectively, via the pivot pins 62' and 64'. In this embodiment, the third and fourth pivots are located above the frame mounting portion 34'.

When the linkage assembly 32' holds the chain guide 31' in its extended position, the chain guide 31' is located over the outermost sprocket 22c, i.e., the furthest sprocket from the seat tube 14. These movements of the chain guide 31' and the linkage assembly 32' are controlled by the shifting unit 16. Specifically, when the rider operates one of the levers of the shifting unit 16 to pull the shift cable 18 against the urging force of the biasing member 33', then the chain guide 31' is moved from one of its retracted position to one of its extended position via the linkage assembly 32'. When the rider operates one of the levers of the shifting unit 16 to release the shift cable 18, then the chain guide 31' is moved from one of its extended position to one of its retracted position via the linkage assembly 32' by the urging force of the biasing member 33'.

The first link 71' has a pair of pivot points formed by the pivot pins 51' and 62' that lie on a longitudinal line which is substantially parallel to a longitudinal line that passes through the pivot points formed by the pivot pins 54' and 64' of the second link 72'. Similarly, the pivot points of the pivot pins 51' and 54' of each first end of the first and second links 71' and 72' lie on a line which is substantially parallel to a line that passes through the pivot points of the pivot pins 62' and 64' of the other or second ends of the first and second links 71' and 72'.

The first link 71' is operatively coupled to the shifting unit 16 via the shift cable 18 for moving the chain guide 31' between the first, second and third gear positions. More specifically, the first link 71' is a L-shaped member that is pivotally mounted on the pivot pin 51' extending outwardly from the first C-shaped clamping portion 34a'. The first link 71' has two mounting holes that receive the pivot pins 51' and 62' for the linkage assembly 32'.

The first link 71' includes a link portion 71a' and an extension portion 71b'. The link portion 71a' has the first and third pivots with a longitudinal axis extending between the first and second pivots and an extension portion 71b' with the cable connection point formed thereon. The extension portion 71b' extends substantially perpendicular to the longitudinal axis of the link portion 71a'. The extension portion 71b' has the cable connection point P' formed thereon.

The extension portion 71b' of the first link 71' has a cable attachment member or screw 73' coupled thereto to form a cable attachment point P' at its free end. The cable attachment member 73' is a wire clamp for attaching the inner wire of cable 18 thereto. The top pull cable guide surface S', the first pivot axis of pivot pin 51' and the cable connection point P' are arranged relative to each other when the chain guide 31' is located in a middle gear position (FIG. 9) such that a section of the cable 18 that extends between the first link 71' and the top pull cable guide surface S' extends substantially perpendicular to a line $L_3$ extending from the first pivot axis of the pivot pin 51' to a point P" where the section of the cable 18 leaves the extension portion 71b'. The first pivot axis of pivot pin 51' and the point P" are arranged along that line $L_3$ that intersects with a line $L_4$ formed by a section of the cable 18. In the bottom gear position (FIG. 8), the line $L_3$ intersects with the line $L_4$ at an acute angle that is close to sixty degrees. In the middle gear position (FIG. 9), the line $L_3$ intersects with the line $L_4$ at an acute angle that is close to one eighty degrees (substantially ninety degrees). In the top gear position (FIG. 10), the line $L_3$ intersects with the line $L_4$ at an obtuse angle that is close to one hundred twenty degrees. Thus, the top pull cable guide surface S', the first pivot axis of pivot pin 51' and the point P" are arranged relative to each other when the chain guide 31 is located in a middle position (FIG. 9) such that a section (line $L_4$) of the cable 18 that extends between the first link 71' and the top pull cable guide surface S' extends substantially perpendicular to the line $L_3$ extending from the first pivot axis of the pivot pin 51 to the point P" where the section of the cable 18 leaves the extension portion 71b'.

The biasing member 33' is preferably a torsion spring having its coiled portion positioned around pivot pin 51' therein. The biasing member 33' urges the first and second links 71' and 72' in a direction such that the chain guide 31' is urged to a low gear position that is located laterally adjacent to the clamping band 30'. The biasing member 33' has a first end 33a' engaging a side of the first link 71', and a second end 33b' engaging a portion on the fixing member 36' of the clamping band 30' for normally biasing the chain guide 31' from its extended position to its retracted position. In other words, biasing member or torsion spring 33' is normally placed under tension to urge the cable guide 32' from its extended position to its retracted position. Of course, movement of the chain guide 31' is controlled by the shifting unit 16 moving cable 18 in a relatively conventional manner.

The chain guide 31' also has a pair of adjustment screws 74' and 75' engage a portion of the linkage assembly 32' for controlling the range of movement of the chain guide 31' in a conventional manner. In other words, by individually adjusting the axial extension of adjustment screws 74' and 75', the retracted (low gear) position and the extended (high or top gear) position of the chain guide 31' are adjusted independently of each other. Since this is a relatively conventional adjustment mechanism that is well known in the prior art, this adjustment mechanism will not be discussed or illustrated in detail herein.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A top pull front derailleur comprising:
    a bicycle frame clamping portion including a frame mounting portion, a top pull cable guide surface and a fixing member;
    first and second linkage members including inner pivot ends and outer pivot ends, the inner pivot ends being pivotally coupled to the fixing member, respectively, one of the first and second linkage members further including a cable connection point disposed laterally from a center plane of a bicycle frame; and
    a chain guide including pivots pivotally coupled to the outer pivot ends of the first and second linkage members, respectively, to move the chain guide laterally towards and away from the bicycle frame clamping portion, the pivots of the chain guide being configured and arranged to remain above the frame mounting portion during and after movement of the chain guide laterally towards and away from the bicycle frame clamping portion,
    the top pull cable guide surface being configured and arranged relative to the bicycle frame clamping portion to guide a derailleur cable from vertically above the bicycle frame clamping portion to the cable connection point, the top pull cable guide surface being further configured and arranged laterally from the center plane such that the cable connection point and the top pull cable guide are on a same side of the center plane.

2. The top pull front derailleur according to claim 1, wherein
    the top pull cable guide surface is formed on a peripheral surface of a roller that is
    rotatably mounted on the bicycle frame clamping portion to rotate about a rotation axis.

3. The top pull front derailleur according to claim 2, wherein
    a section of the top pull cable guide surface is arranged to be substantially adjacent a center plane of a bicycle frame.

4. The top pull front derailleur according to claim 2, wherein
    the top pull cable guide surface and the cable connection point are arranged such that the top pull cable guide surface is disposed laterally between the cable connection point and a center plane of a bicycle frame.

5. The top pull front derailleur according to claim 2, wherein
    the rotation axis of the roller and the cable connection point are substantially aligned along a plane that is parallel to a center plane of a bicycle frame.

6. The top pull front derailleur according to claim 2, wherein
    the first linkage member includes a link portion with a longitudinal axis and an extension portion with the cable connection point formed thereon, the extension portion extending substantially perpendicular to the longitudinal axis of the link portion.

7. The top pull front derailleur according to claim 2, wherein
    the top pull cable guide surface, the first linkage member and the cable connection point are arranged relative to each other such that the derailleur cable is pulled in a direction from a first distal position to a second proximal position that is closer to the chain guide than the first distal position.

8. The top pull front derailleur according to claim 2, wherein
    the top pull cable guide surface, the first linkage member and the cable connection point are arranged relative to each other when the chain guide is located in a middle gear position that is located laterally farthest from the bicycle frame clamping portion such that a cable section of the derailleur cable that extends between the first linkage member and the top pull cable guide surface extends substantially perpendicular to a line extending between a pivot axis where the first linkage member is coupled to the fixing member and to a point where the cable section of the derailleur cable leaves the first linkage member.

9. The top pull front derailleur according to claim 1, wherein
    a section of the top pull cable guide surface is arranged to be substantially adjacent a center plane of a bicycle frame.

10. The top pull front derailleur according to claim 1, wherein
    the top pull cable guide surface and the cable connection point are arranged such that the top pull cable guide surface is at least partially disposed laterally between the cable connection point and a center plane of a bicycle frame.

11. The top pull front derailleur according to claim 1, wherein
    the top pull cable guide surface and the cable connection point are disposed laterally on a first lateral side of a pivot axis where the inner pivot end of the first linkage member is pivotally coupled, and
    the chain guide is located on a second lateral side of the first pivot.

12. The top pull front derailleur according to claim 1, wherein
    the first linkage member includes a link portion with a longitudinal axis and an extension portion with the cable connection point formed thereon, the extension portion extending substantially perpendicular to the longitudinal axis of the link portion.

13. The top pull front derailleur according to claim 1, wherein
    the top pull cable guide surface, the first linkage member and the cable connection point are arranged relative to each other such that the derailleur cable is pulled in a direction from a first distal position to a second proximal position that is closer to the chain guide than the first distal position.

14. The top pull front derailleur according to claim 1, wherein
    the top pull cable guide surface, the first linkage member and the cable connection point are arranged relative to each other when the chain guide is located in a middle gear position that is located laterally farthest from the bicycle frame clamping portion such that a cable section of the derailleur cable that extends between the first linkage member and the top pull cable guide surface extends substantially perpendicular to a line extending between a pivot axis where the first linkage member is coupled to the fixing member and to a point where the cable section of the derailleur cable leaves the first linkage member.

* * * * *